United States Patent [19]

Grosso

[11] Patent Number: 5,355,209
[45] Date of Patent: Oct. 11, 1994

[54] DEVICE FOR MEASURING THE DIAMETER OF AN OBJECT THAT IS LARGELY CYLINDRICAL, FOR EXAMPLE AN OPTICAL FIBER, WITHOUT CONTACT

[75] Inventor: Philippe Grosso, Lannion, France

[73] Assignee: France Telecom, Establissement Autonome, France

[21] Appl. No.: 903,888

[22] Filed: Jun. 25, 1992

[30] Foreign Application Priority Data

Jul. 8, 1991 [FR] France .................... 91 08545

[51] Int. Cl.$^5$ .................. G01N 21/00; G01B 11/10
[52] U.S. Cl. ...................... 356/73.1; 356/357
[58] Field of Search ............... 356/73.1, 357; 250/560

[56] References Cited

U.S. PATENT DOCUMENTS

| 3,994,599 | 11/1976 | Southwell . |
| 4,882,497 | 11/1989 | Inoue et al. .................... 356/73.1 X |
| 4,973,343 | 11/1990 | Frazee, Jr. et al. ........... 356/73.1 X |
| 5,015,867 | 5/1991 | Siegel et al. ......................... 250/560 |

FOREIGN PATENT DOCUMENTS

| 0348607 | 1/1989 | European Pat. Off. . |
| 0400912 | 5/1990 | European Pat. Off. . |
| WO84/04158 | 4/1984 | Hungary . |
| 7609627 | 3/1978 | Netherlands . |

OTHER PUBLICATIONS

Article by S. Holly, published in Laser Focus, vol. 12, No. 3, Mar. 1976, pp. 58 to 60.

*Primary Examiner*—Vincent P. McGraw
*Assistant Examiner*—K. P. Hantis
*Attorney, Agent, or Firm*—Pearne, Gordon, McCoy & Granger

[57] ABSTRACT

A device for measuring the diameter of an object that is generally cylindrical such as, for example, an optical fiber, without contact.

This device includes a laser (4) capable of emitting a luminous beam, optical means (6, 8, 10) provided to form first and second luminous beams from the luminous beams emitted by the laser and to illuminate the object (2) with these first and second luminous beams, so as to obtain two luminous beams reflected by the object which interfere with one another, and means (CCD, 14) of photo-detection and analysis of the interference between the two reflected beams, capable of determining the diameter of the object from the interference fringes.

9 Claims, 2 Drawing Sheets

DEVICE FOR MEASURING THE DIAMETER OF AN OBJECT THAT IS LARGELY CYLINDRICAL, FOR EXAMPLE AN OPTICAL FIBER, WITHOUT CONTACT

BACKGROUND OF THE INVENTION

This invention concerns a device for measuring the diameter of a largely cylindrical object.

This device makes it possible to measure the diameter of such an object without contact.

This invention applies particularly to measuring the diameter of an optical fiber and, specifically, to measuring the diameter of an optical fiber while it is being drawn.

Various techniques for measuring the diameter of an optical fiber without contact are already known, namely:

Photometric measurements, in which the quantity of light masked is proportional to the diameter and which give low resolution, equal to 1 micrometer, Spatial measurements, in which an image of the fiber is formed on a charge-coupled device ("charge-coupled device" in English-language publications), or CCD cell, which also give low resolution, equal to 0.5 micrometer, and Temporal measurements, in which the interception time of a laser scanning beam is measured, which also give low resolution, equal to 0.5 micrometer.

Another measurement technique without contact is also known, according to which the optical fiber is illuminated by a laser, and the interfringe in the interference pattern that is given is measured in a chosen direction by a refracted luminous beam and by a luminous beam reflected by the fiber.

This other technique is described in the following document (1):

Thesis presented to the University of Saint Etienne by Lionel DeLaunay, entitled "Study and Realization of a System for Measuring the Diameter of an Optical Fiber" (1986).

It gives great resolution, equal to 0.1 micrometer, but has some drawbacks:

since the fringes observed are the result of interference between the reflected beam and the refracted beam, whose nature and intensity are different, the calculation, which is made in this other technique to determine the diameter of the fiber, involves the quality and, more precisely, the refraction index of silica, of which the fiber is composed, an index which not always known to within $\pm 10^{-5}$, and The interference fringes do not contrast much; they are superimposed on a high, noisy continuous background.

SUMMARY OF THE INVENTION

The device in this invention is a measurement device, without contact, particularly for the diameter of an optical fiber, which does not have the preceding drawbacks, while also giving great resolution, equal to 0.1 micrometer.

To do so, the device in the invention uses two luminous beams which are reflected by the object, outside of its refraction pattern when the object is capable of reflecting part of an incident light and transmitting another part of it, like, for example, an optical fiber, and which result from the simultaneous illumination of the object by two luminous beams that come from the same laser.

To be precise, the device in this invention is characterized by the fact that it includes:

a laser that can emit a luminous beam, optical means provided to form first and second luminous beams from the luminous beams emitted by the laser and to illuminate the object with these first and second luminous beams, so as to obtain two luminous beams reflected by the object which interfere with one another and means of photo-detection and analysis of interference between the two reflected beams which can determine the diameter of the object from the interference fringes.

It is assumed, of course, that the object can reflect at least some of the light that comes from the laser.

Said optical means can include:

means of dividing the beam emitted by the laser into two beams, first means of reflection provided to form the first beam from one of these two beams that come from the means of dividing and second means of reflection provided to form the second beam from the other beam that comes from the means of dividing.

Said means of photo-detection and analysis can include:

a charge-coupled device provided to receive the two beams reflected which interfere with one another, and electronic means for processing signals provided by this charge-coupled device to determine the diameter of the object.

Preferably, the device that is the object of the invention also includes means of angular magnification of the distance between the interference fringes, these means of angular magnification preceding the means of photo-detection and analysis.

This makes it possible to reduce the distance between the object and the means of photo-detection and analysis, and therefore to obtain a more compact measurement device.

BRIEF DESCRIPTION OF THE DRAWINGS

This invention will be better understood by reading the description of one example of embodiment given below purely in an indicative and non-limiting way, with reference to the attached drawings, in which.

DETAILED DESCRIPTION OF THE PREFERRED EMBODIMENT

Figure 1:
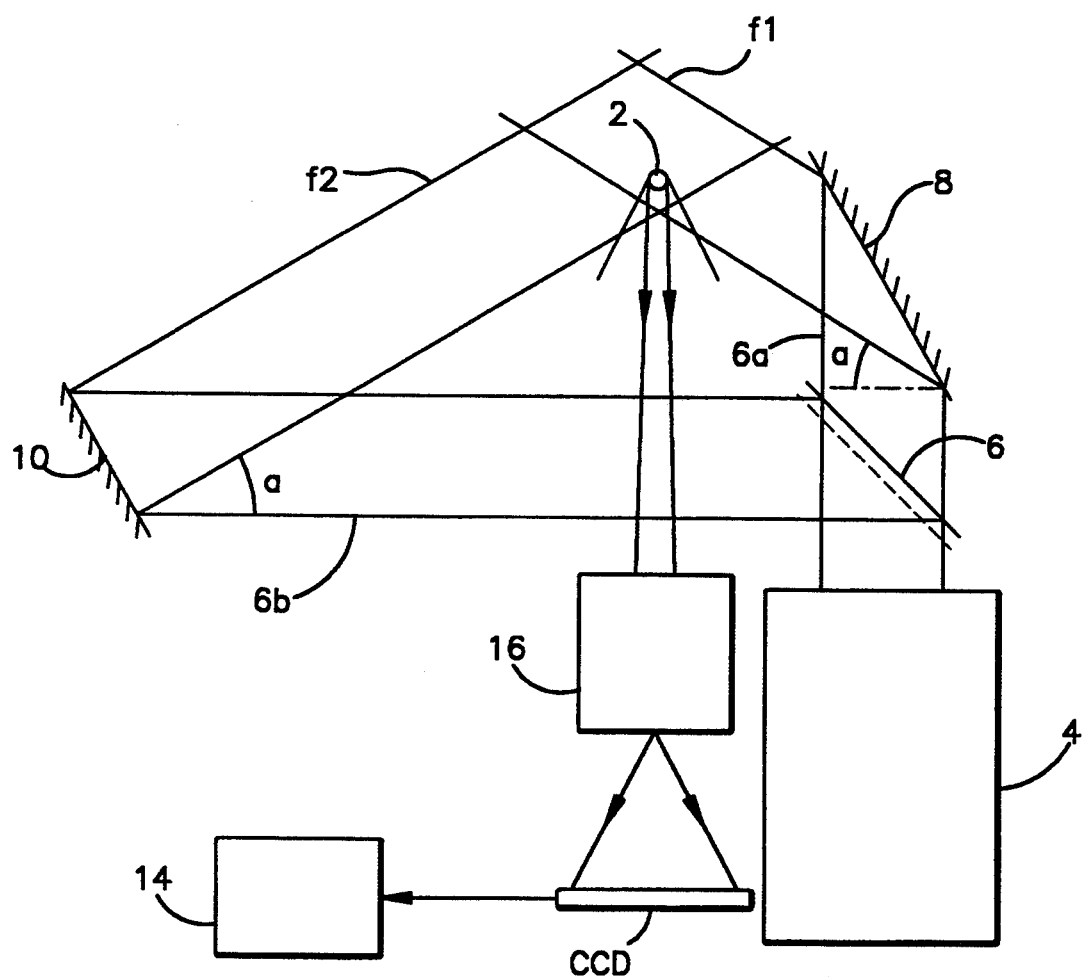
FIG. 1 is a schematic view of a special method of embodiment of the device that is the subject of the invention, making it possible to determine the diameter of an object like an optical fiber, for example.

The device according to the invention, which is shown schematically FIG. 1, is designed to determine the diameter of a largely cylindrical object, such as an optical fiber.

In the example shown, the optical fiber 2, made of silica, comes from a column of fibers and has no protective coating at this stage of its production.

The device shown in FIG. 1 includes:
a laser 4, for example, an He—Ne laser,
a semi-transparent blade 6, which is inclined 45° in relation to the beam coming from the laser 4,
first reflector 8 and a second reflector 10.

The semi-transparent blade 6 is capable of transmitting part 6a of the beam emitted by the laser 4, with the intensity of this part being half the intensity of the beam, and of reflecting perpendicularly to this beam another part 6b of the latter, with the intensity of that part 6b also being half the intensity of the beam.

The first reflector 8 is provided to intercept the part 6a of the beam that comes from the laser and to reflect it, thus forming a first measurement beam f1 whose inclination, compared to the part 6b of the beam emitted by the laser 4, is marked a.

The second reflector 10 is provided to intercept this part 6b of the beam that comes from the laser and to reflect it, so as to form a second measurement beam f2,
which meets measurement beam f1,
whose inclination, compared to the part 6b of the beam that comes from the laser, has the same value a as the inclination of the beam f1, and
whose intensity is equal to that of the beam f1.

Moreover, the unit composed of the laser 4, the blade 6 and the reflectors 8 and 10 is placed so that the beams f1 and f2 are perpendicular to the fiber 2 whose diameter $\phi$ one wishes to measure, and this fiber crosses the area where the beams f1 and f2 meet.

Under these conditions, part of the beam f1 is reflected in a point A of the optical fiber 2 (see FIG. 2) to generate a reflected beam fA (which, in the example shown, is parallel to the beam that comes from the laser 4).

Similarly, part of the beam f2 is reflected in a point B of the optical fiber 2 to generate a reflected beam fB which is parallel to the reflected beam fA.

The two points A and B act as secondary light sources with the same intensity.

The reflected beams fA and fB, which come from these sources A and B, respectively, have the same intensity and interfere with one another.

Moreover, these reflected beams fA and fB are outside of the refraction pattern of the optical fiber 2, that is to say, outside of the light that results from the refraction of the beam f1 by the fiber 2 and outside of the light that results from the refraction of the beam f2 by this fiber 2.

It is the interference between the beams fA and fB that is measured with the device in FIG. 1, and the luminous beams refracted, which are formed by the fiber 2 from the beams f1 and f2, are not in the field of measurement.

Figure 2:
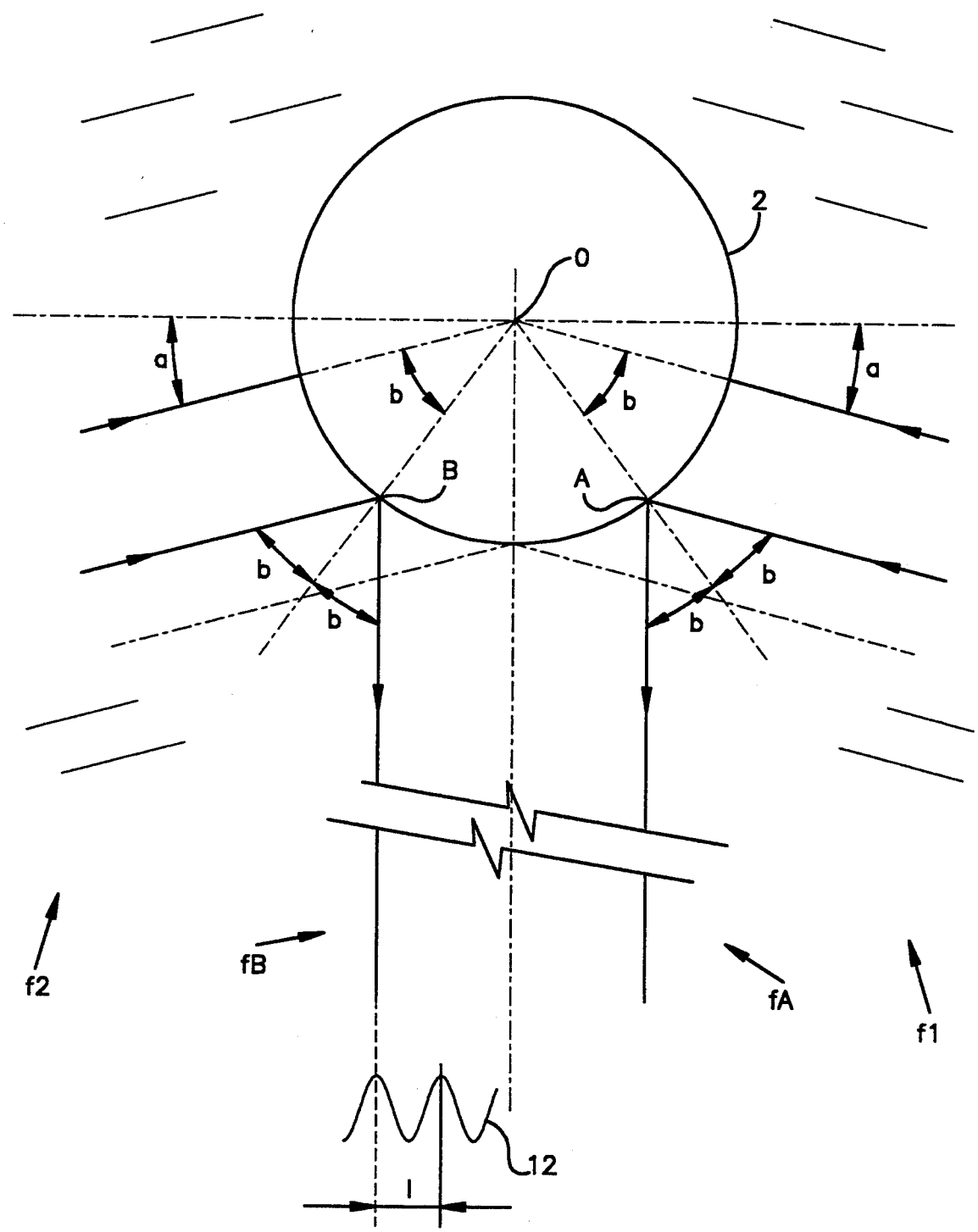
FIG. 2 illustrates the calculation of the diameter of this optical fiber.

The device shown in FIG. 1 also includes a charge-coupled device which intercepts the interfering beams fA and fB and which detects the interference fringes 12 (FIG. 2).

The device shown in FIG. 1 also includes electronic means 14 of processing signals furnished by the CCD, which calculate the diameter $\phi$ of the optical fiber to within 0.1 micrometer.

In order to reduce the projection distance, or the observation distance D, i.e., the distance between the axis of the fiber 2, whose path 0 is seen in FIG. 2, and the CCD, there is a collimator 16 between the latter and the fiber 2 to enlarge, that is, to magnify angularly, the interfringe on the CCD which "observes" the interference fringes.

This therefore gives the measuring device greater compactness.

The means of electronic processing 14 determine the diameter $\phi$ of the optical fiber 2 by the following formula (1):

$$\phi = L \cdot D \cdot I^{-1} \cdot (\cos X)^{-1} \qquad (1)$$

$$X = (a/2) + (pi/4).$$

In these formulas:
pi is the well known number, which is equal to approximately 3.14
a is expressed in radians,
L is the wavelength of the laser 4,
I is the value of the interfringe.

At an observation distance of 1 meter, a fiber whose diameter is around 125 micrometers can move ±1 mm in the area of intersection of the beams f1 and f2 while remaining within the measurement precision (±0.1 micrometer).

This 1 meter distance can be moved back to 20 cm using a magnification 5 collimator 16.

Remember that the angular value Ia of the interfringe is given by the following formula (2):

$$Ia = L \cdot \phi^{-1} \cdot (\cos X)^{-1} \qquad (2)$$

For a fiber whose diameter is equal to 125 micrometers, an He—Ne laser and an angle a equal to 20° (the angle b, the angle between the beam fA and the ray 0A of the path of the fiber in the plane of FIG. 2 equals 35°), the angular value of the interfringe equals 8.83 milliradians.

A variation of 1 micrometer in the diameter of the fiber entails a variation of 70 microradians in the angular value of the interfringe.

Please note that a variation in the position of the fiber in the area where the beams f1 and f2 cross moves the network of interference fringes, but does not change the angular value of the interfringe.

In other words, the depth of the field is very great.

It is limited by the width of the beam that comes from the laser.

I claim:
1. A device for measuring, without contact, a diameter of a generally cylindrical object, said device comprising:
a laser which emits a luminous beam,
optical means for forming separate first and second luminous beams from the luminous beam emitted by the laser, and for illuminating the object with the first and second luminous beams, and obtaining two luminous beams reflected by the object which interfere with one another, and
means for photo-detection and analysis of the interferences of the two reflected beams, capable of determining the diameter of the object from the interference fringes.

2. A device for measuring, without contact, a diameter of a generally cylindrical object capable of reflecting part of an incident light beam and transmitting another part of the incident light beam, said device comprising:
a laser which emits a luminous beam,
optical means provided for forming first and second luminous beams from the luminous beam emitted by the laser and for illuminating the object with said first and second luminous beams and obtaining two luminous beams reflected by the object outside a refraction pattern of said object, said reflected beams interfering with one another, and means for photo-detection and analysis of the interference between the two beams reflected by the object, outside the refraction pattern of said object, said photodetection and analysis means being capable of determining the diameter of the object from the interference fringes.

3. A device according to claim 1, wherein the optical means include:

means for dividing the beam emitted by the laser into two beams, first reflection means for forming the first beam from one of the two beams that come from the dividing means, and second reflection means for forming the second beam from the other beam that comes from the dividing means.

4. A device according to claim 1, wherein the photo-detection and analysis means include:

a charge-coupled device to receive the two reflected beams which interfere with one another, and electronic means for processing signals furnished by the charge-coupled device to determine the diameter of the object.

5. A device according to claim 1, further including means for angular magnification of the distance between the interference fringes, said angular magnification means preceding the photo-detection and analysis means.

6. A device according to claim 2, wherein it is used to measure a diameter of an optical fiber.

7. A device according to claim 2, wherein the optical means include:

means for dividing the beam emitted by the laser into two beams, first reflection means for forming the first beam from one of the two beams that come from the dividing means, and second reflection means for forming the second beam from the other beam that comes from the dividing means.

8. A device according to claim 2, wherein the photo-detection and analysis means include:

a charge-coupled device for receiving the two reflected beams which interfere with one another, and electronic means for processing signals furnished by the charge-coupled device to determine the diameter of the object.

9. A device according to claim 2, further including means for angular magnification of the distance between the interference fringes, said angular magnification means preceding the photo-detection and analysis means.

* * * * *